United States Patent
Bala et al.

(10) Patent No.: US 7,835,033 B2
(45) Date of Patent: Nov. 16, 2010

(54) GAMUT BOUNDARY SEPARATED PRINT SYSTEM PROFILING METHODS AND SYSTEMS

(75) Inventors: Raja Bala, Webster, NY (US); Martin S. Maltz, Rochester, NY (US); Lalit Keshav Mestha, Fairport, NY (US); Alvaro Enrique Gil, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 131 days.

(21) Appl. No.: 12/019,940

(22) Filed: Jan. 25, 2008

(65) Prior Publication Data

US 2009/0190144 A1 Jul. 30, 2009

(51) Int. Cl.
*G06F 15/00* (2006.01)

(52) U.S. Cl. .................. 358/1.9; 358/3.01; 358/3.23; 358/520; 358/406; 358/504; 382/167; 382/274; 345/606

(58) Field of Classification Search .................. 358/1.9, 358/518, 504, 1.1; 382/167, 274
See application file for complete search history.

(56) References Cited

U.S. PATENT DOCUMENTS 5,721,572 A * 2/1998 Wan et al. .................. 345/590
6,744,531 B1 * 6/2004 Mestha et al. .............. 358/1.9
2007/0035753 A1 * 2/2007 Ichitani ...................... 358/1.9
2007/0041026 A1 * 2/2007 Tin ............................ 358/1.9

OTHER PUBLICATIONS

U.S. Appl. No. 11/507,405, filed Aug. 21, 2006, Hancock et al.
U.S. Appl. No. 11/507,406, filed Aug. 21, 2006, Gil et al.
U.S. Appl. No. 11/789,091, filed Apr. 23, 2007, Mestha et al.
U.S. Appl. No. 11/313,018, filed Dec. 20, 2005, Mizes et al.
U.S. Appl. No. 11/636,747, filed Dec. 11, 2006, Mestha et al.
U.S. Appl. No. 11/636,841, filed Dec. 11, 2006, Wang et al.
U.S. Appl. No. 11/789,091, filed Apr. 23, 2007, Mestha et al.
Peter Zolliker & Klaus Simon, "On the Continuity of Gamut Mapping Algorithms" Journal of Electronic Imaging 15(1), 013004 (Jan.-Mar. 2006).
"End-to-End Color Printer Calibration by Total Least Squares Regression" by M. Xia, E. Saber, G. Sharma, A. M. Tekalp, IEEE Transactions on Image Processing, vol. 8. No. 5, May 1999.
"A Printer Model for Dot-On-Dot Halftone Screens" by R. Balasubramanian, in Proc. SPIE: Color Hard Copy and Graphics Arts IV, vol. 2413, pp. 356-364, 1995.

* cited by examiner

*Primary Examiner*—Benny Q Tieu
*Assistant Examiner*—Paul F Payer
(74) *Attorney, Agent, or Firm*—Fay Sharpe LLP

(57) ABSTRACT

This disclosure provides a method and system to generate device dependent color space representations for an image output device. The method and system are particularly applicable to a printing device, where gamut boundary separated profile methods are executed to map device in-gamut and device out-of-gamut colors.

17 Claims, 2 Drawing Sheets

GAMUT BOUNDARY SEPARATED PRINT SYSTEM PROFILING METHODS AND SYSTEMS

BACKGROUND

This disclosure relates to color printing systems. Specifically, this disclosure relates to methods and systems for mapping in-gamut and out-of-gamut colors.

In the field of printing, printer profiles are used to determine device-dependent colorant values needed to make a specific color. These printer profiles contain multidimensional transforms that map device-independent (or calorimetric) values to device dependent values and vice versa. For example, a three colorant printing device generally includes cyan, magenta and yellow (C, M, Y) colorants in the form or toner, ink or dye. The printer profile would comprise a multidimensional transform in the form of a 3-D lookup table (LUT) that maps a plurality of input 3D calorimetric signals to CMY device values that will produce the requested input calorimetric signals when printed to the given device. Alternatively, the printer profile may be applicable for a four colorant printer that also employs black (K) in addition to C, M, Y. In this case the 3D LUT maps 3D input colorimetric signals to CMYK device values that will produce the requested input colorimetric signals when printed to the given device. A similar reasoning applies for other types of printers, including ones that employ special colorants in addition to the four standard CMYK colorants, such as orange (O), violet (V), and green (G).

One method of building a LUT is to use an iterative controls technique to search for the device dependent colorant values, e.g. CMYK values, for each node in the LUT until the desired color at that node is achieved. The search could take place either by iterating on the real printer or by iterating on a printer model that accurately reflects the color characteristics of the real printer. An important observation is that a substantial fraction, most often the majority, of the nodes in the LUT corresponds to colors the printing device cannot print. These colors are referred to as out-of-gamut colors.

One approach to determining device dependent colorant values for out-of-gamut colors is to simply map the out-of-gamut color to in-gamut colors, and then carry out the iterative search process for the mapped in-gamut colors.

One disadvantage associated with an iterative method of mapping out-of-gamut colors to in-gamut colors is the number of measurements required. In other words, iterative methods typically include multiple measurements to iteratively narrow in on a desired outcome.

This disclosure provides an alternative method and system for determining in-gamut and out-of-gamut values for a LUT that involves substantially fewer iterative search calculations.

INCORPORATION BY REFERENCE

The following references are totally incorporated herein by reference.

"SYSTEM AND METHOD FOR AUTOMATED SPOT COLOR EDITOR" by J D Hancock et al, U.S. patent application Ser. No. 11/507,405 filed Aug. 21, 2006.

"SPOT COLOR CONTROLS AND METHOD" by Alvaro Gil et al., U.S. patent application Ser. No. 11/507,406, filed Aug. 21, 2006.

"A METHOD OF GENERATING PROFILE LUTS USING PRINCIPAL COMPONENTS AND A METHOD OF UPDATING LUTS IN THE FIELD" by Lalit Keshav Mestha et al., U.S. patent application Ser. No. 11/789,091, filed Apr. 23, 2007.

"OPTIMAL TEST PATCH LEVEL SELECTION FOR SYSTEMS THAT ARE MODELED" by Zhigang Fan et al., U.S. patent application Ser. No. 11/314,670, filed Dec. 21, 2005.

"METHODS & APPARATUSES FOR CONTROLLING PRINT DENSITY" by Howard A. Mizes et al., U.S. patent application Ser. No. 11/313,018, filed Dec. 20, 2005.

"END-TO-END COLOR PRINTER CALIBRATION BY TOTAL LEAST SQUARES REGRESSION" by M. Xia, E. Saber, G. Sharma, A. M. Tekalp, IEEE Transactions on Image Processing, Vol. 8. No. 5, May 1999.

"A PRINTER MODEL FOR DOT-ON-DOT HALFTONE SCREENS" by R. Balasubramanian, in Proc. SPIE: Color Hard Copy and Graphic Arts IV, vol. 2413, pp. 356-364, 1995.

"A METHOD AND SYSTEM FOR IDENTIFYING OPTIMAL MEDIA FOR CALIBRATION" by Lalit Keshav Mestha et al., U.S. patent application Ser. No. 11/636,747, filed Dec. 11, 2006.

"OPTIMAL COLOR TEST PATCH SELECTION FOR MULTI-MEDIA PRINTING SYSTEMS USING LOW RANK APPROXIMATION" by Yao Rong Wang et al., U.S. patent application Ser. No. 11/636,841 filed Dec. 11, 2006.

"IMAGE OUTPUT COLOR MANAGEMENT SYSTEM AND METHOD" by Mestha et al., U.S. patent application Ser. No. 11/789,091, filed Apr. 23, 2007.

"ON THE CONTINUITY OF GAMUT MAPPING ALGORITHMS" by Peter Zolliker & Klaus Simon, Journal of Electronic Imaging 15(1), 013004 (January-March 2006).

BRIEF DESCRIPTION

In one aspect of this disclosure, a method of generating device dependent color space representations for an image output device is disclosed which comprises (a) generating a calorimetric multi-dimensional LUT including a plurality of nodes, the nodes associated with a plurality of discrete device independent color space representations of a plurality of respective colors, wherein the LUT includes a plurality of nodes associated with colors within the color gamut of the image output device and a plurality of nodes associated with colors outside the color gamut of the image output device; (b) using an iterative process to determine image output device dependent color space representations associated with the plurality of in-gamut nodes; (c) mapping the plurality of out-of-gamut nodes to the device gamut boundary; (d) determining image output device dependent color space representations associated with the plurality of out-of-gamut nodes mapped at the device gamut boundary via a non-iterative interpolation among nearby device independent colors for which device dependent color space representations have been pre-calculated; and (e) generating a device dependent color space representation for a device independent color space representation not associated with a node, by interpolating among a plurality of nodes nearby the device independent color space representation not associated with a node.

In another aspect of this embodiment, an image output system is disclosed. The image output system comprises an image output device; and a controller, operatively connected to the image output device, the controller configured to execute a method of generating device dependent color space representations for the image output device, the method comprising: (a) generating a colorimetric multi-dimensional LUT including a plurality of nodes, the nodes associated with a plurality of discrete device independent color space representations of a plurality of respective colors, wherein the LUT includes a plurality of nodes associated with colors within the color gamut of the image output device and a plurality of nodes associated with colors outside the color gamut of the image output device; (b) using an iterative process to determine image output device dependent color space representations associated with the plurality of in-gamut nodes; (c) mapping the plurality of out-of-gamut nodes to the gamut boundary associated with the image output device; (d) determining image output device dependent color space representations associated with the plurality of out-of-gamut nodes mapped at the device gamut boundary via a non-iterative interpolation among nearby device independent colors for which device dependent color space representations have been pre-calculated; and (e) generating a device dependent color space representation for a device independent color space representation not associated with a node, by interpolating among a plurality of nodes nearby the device independent color space representation not associated with a node.

In yet another aspect of this disclosure, a xerographic imaging system is disclosed. The xerographic imaging system comprises one or more IMEs (image marking engines); a controller operatively connected to the one or more IMEs, the controller configured to execute a method of generating device dependent color space representations of an image to be printed by one or more IMEs, the method comprising (a) generating a calorimetric multi-dimensional LUT including a plurality of nodes, the nodes associated with a plurality of discrete device independent color space representations of a plurality of respective colors, wherein the LUT includes a plurality of nodes associated with colors within the color gamut of the IME and a plurality of nodes associated with colors outside the color gamut of the IME; (b) performing an iterative process to determine IME dependent color space representations associated with the plurality of in-gamut nodes; (c) mapping the plurality of out-of-gamut nodes to the device gamut boundary; (d) determining IME dependent color space representations associated with the plurality of out-of-gamut nodes mapped at the device gamut boundary using a non-iterative process; and (e) generating a device dependent color space representation for a device independent color space representation not associated with a node, by interpolating among a plurality of nodes nearby the device independent color space representation not associated with a node.

DETAILED DESCRIPTION

Figure 1:
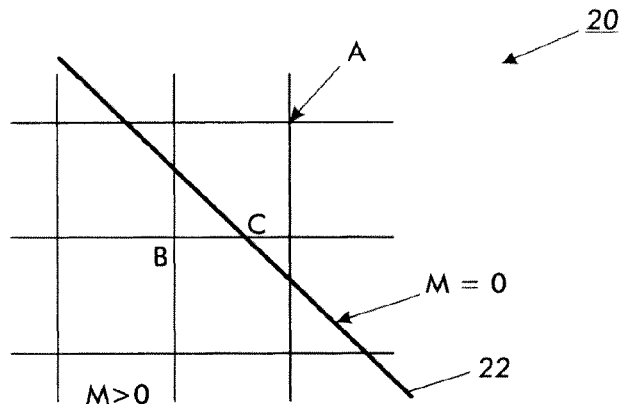
FIG. 1 illustrates a gamut boundary for a printer according to one aspect of this disclosure; and, FIG. 2 illustrates an exemplary method of generating CMYK values for out-of-gamut nodes according to this disclosure.

This disclosure, and the embodiments disclosed therein, apply different methods for filling in-gamut and out-of-gamut nodes in an image output device profile, such as a printer. Printer profiles generally comprise three dimensional look up tables that map between colorimetric and device signals. For specificity in this disclosure, we will use an L*a*b* colorimetric and a CMY device space, though other color spaces could be used. These tables generally comprise a 3D grid of the order of 33×33×33 nodes, or smaller, so interpolation is used for finding the device values for input colors not on the nodes. These tables are subsequently used for processing images with potentially tens of millions of pixels, so the interpolation method must be simple and fast. To provide a simple and fast interpolation for finding device values, the nodes are arranged in a rectangular grid to make it easy to find a sub-cube that contains the desired color. Subsequently, some variation of linear interpolation between the device values at the corners of this sub-cube is used to find the device values for the desired color.

An accurate method of building a LUT is to use an iterative controls technique to search for the device dependent colorant values, e.g. CMYK values, for each node in the LUT until the desired color at that node is achieved. An ASCE (Automated Spot Color Editor) approach can be used to make this search process rapidly converge. (See U.S. patent application Ser. No. 11/507,405.) However, between 70 and 90% of the nodes in the table correspond to colors the printer cannot make since they are colors outside the printer's gamut. The precise percentage is a function of the color space and node spacing used. Notably, the standard approach is to map the out of gamut nodes to colors within the printer's gamut, and find the device values that make these colors using the same iterative approach. This requires many measurements thus making printer profiling an arduous and costly process.

In the present disclosure, the iterative process is used to obtain device values only for all the nodes of the sub-cubes that lie within the printer gamut. Next, device values for the remaining out-of-gamut nodes in the profile are calculated as follows. The out-of-gamut nodes are first mapped to colors on the printer gamut surface using any known gamut mapping technique. Device values are then obtained using interpolation among nearby colors. This avoids the need to perform a laborious iterative process for the out-of-gamut nodes. The interpolation can be done in one of several ways, three of which are described herein.

The preferred embodiment determines out-of-gamut nodes by mapping them to the device gamut surface and then interpolating among a set of gamut surface measurements obtained via a separate gamut surface characterization. Iterative searching is not required for the surface measurements. More specifically, device dependent color values known to be on the surface of the gamut are either printed and measured or mapped through a printer model to obtain device independent color values. The surface of the gamut is described by a triangular mesh in device-independent space, with these device independent color values being the vertices of the triangles. At each triangle vertex, the corresponding device dependent color values are also stored.

As an example, consider the surface of the gamut of a CMY printer represented in device color space, which can be represented as a series of planes:

C=100% with a MY grid;
M=100% with a CY grid;
Y=100% with a MC grid;
C=0% with a MY grid;
M=0% with a CY grid; and
Y=0% with a MC grid.

The calorimetric (e.g. L*a*b*) values can be obtained for these CMY values by printing the appropriate CMY points and measuring the color with a standard color measurement instrument. These points define the surface of the gamut. Standard computational geometry techniques are used to define the surface of the gamut as a set of triangles with the points as the vertices.

For a CMYK printer, gamut surface determinations are a bit more complicated. The top surface of the gamut is defined by:

C=0% with a MY grid;
M=0% with a CY grid; and
Y=0% with a MC grid.

However the way to make color darker with the most saturation is not to add the complementary color, but to add black (K). The sides of the gamut are therefore defined by six planes:

C=100% with a MK grid;
C=100% with a YK grid;
M=100% with a CK grid;
M=100% with a YK grid;
Y=100% with a MK grid; and
Y=100% with a CK grid.

Finally, the bottom of the gamut is defined by three additional planes. For a normal printer, the darkest color is CMYK. Therefore the planes are:

K=100% & Y=100% with a CM grid;
K=100% & C=100% with a YM grid; and
K=100% & M=100% with a CY grid.

Notably, all of these colors are very close to each other, very dark, and not very colorful. However, for some printers, the addition of CMY lightens K, so the darkest color is obtained with pure K. In this case, the bottom planes are:

K=100% & Y=0% with a CM grid;
K=100% & C=0% with a YM grid; and
K=100% & M=0% with a CY grid.

In addition, the saturation and lightness of many colors can be high, even with K=100%. However, the CMYK cases can be handled exactly the same way as the CMY cases after the gamut boundary has been defined. Once again standard computational geometry techniques can be used to triangulate the gamut surface.

Once the gamut surface has been characterized, the next step is to find device values for a LUT node that is out of gamut. The node color is first mapped to the triangular gamut surface mesh, resulting in a point that lies on one of the triangles in the mesh. The device dependent color values for this point are then found by interpolation among the device dependent color values of the three vertices of the enclosing triangle.

One potential limitation of this approach is if the triangulation is sparse in certain regions of the gamut surface, then linear interpolation among distant triangle vertices may not yield desirable results.

In a second embodiment, device values for those nodes immediately outside of the gamut are found by extrapolation. The extrapolated device values are then interpolated to calculate the device values for LUT nodes that have been mapped to the surface of the gamut. For example, illustrated in FIG. 1 is a gamut boundary 24 where Magenta (M) goes to zero. Point C is a result of mapping an out-of-gamut node to the gamut surface. The device values at point C are to be found by interpolating among nearby nodes, including node A that is immediately outside the gamut. The method finds the Magenta value at node A by extrapolating the in gamut Magenta values. This will produce a negative Magenta value at node A, and the Magenta value at point C will be close to zero, as desired. One potential limitation of this approach is that if a simple extrapolation method is used, and the desired hue angle for node A and B are the same, the hue angle for node A may not be correct since it is determined by extrapolation.

In a third embodiment, calorimetric values for those nodes immediately outside of the gamut are mapped to the surface of the gamut, and the corresponding device values are found by the same iterative search algorithm used for the in-gamut colors. These device values are then interpolated to calculate the device values for all the other, further out of gamut LUT nodes after they have been mapped to the surface of the gamut. Notably, this method does have some limitations. For example, with continuing reference to FIG. 1, out-of-gamut node A is mapped to the surface of the gamut 24 and the iterative procedure results in node A being attributed a Magenta device value equal to zero. Now, in order to calculate a device value at point C, which is on the surface of the gamut, linear interpolation is performed between node B and node A. Since the device value of node B is greater than zero, and the device value of node A is equal to zero, the interpolated device value for point C will be greater than zero, which will not give a correct color.

In general, the first and second methods will produce more accurate device values inside the gamut and on the gamut boundary. However, the third method produces a "soft shoulder" response. In other words, this method maps colors outside the gamut to the surface of the gamut, compresses colors at the gamut surface to the interior of the gamut to varying extents, and leaves colors well within the gamut alone. This tends to reduce saturation and contrast, but also helps soften the harsh transition from out-of-gamut to in-gamut colors. Another point to note is that the second and third methods will converge and their limitations will diminish as the number of nodes in the LUT increases.

Figure 2:
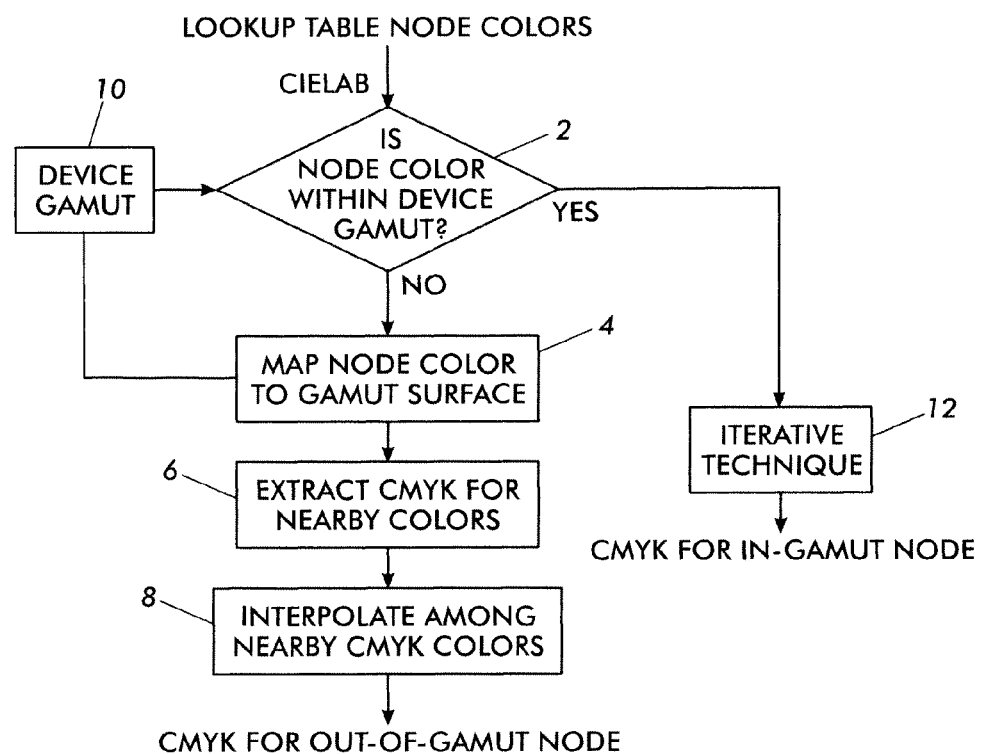

With reference to FIG. 2, illustrated is an exemplary method of generating device dependent color space representations for an image output device according to this disclosure. Further, the illustrated method specifically applies to a CIE LAB to CMYK conversion for a printing device. However, the method is not limited to a specific color space. For example, other color spaces, such as RGM, CMY, and other CIE color spaces, are within the scope of the disclosed method.

As previously discussed, initially, a look-up table is generated, the look-up table including a grid of node colors.

Next 2, a color management process determines whether or not each node associated with the LUT is within the printing device gamut 10.

Nodes associated with in-gamut colors are processed 12 through an iterative process which generates CMYK values for in-gamut nodes.

Nodes associated with out-of-gamut colors are mapped 4 to the printing device gamut surface.

Next 6, the CMYK values are extracted for nearby colors.

Next 8, interpolation is performed among the nearby CMYK colors to generate CMYK values for out-of-gamut nodes.

It is to be understood, mapping 4 node colors to a gamut surface can be accomplished using many known gamut-mapping techniques. See "Continuity of Gamut Mapping Algorithms," by Rolliker et al. Furthermore, as previously discussed in this disclosure, the extraction step 6 can take the form of either extracting CMYK values for surrounding triangle vertices on the gamut surface, or extracting CMYK values for LUT node vertices of an enclosing subcell.

Figure 3:
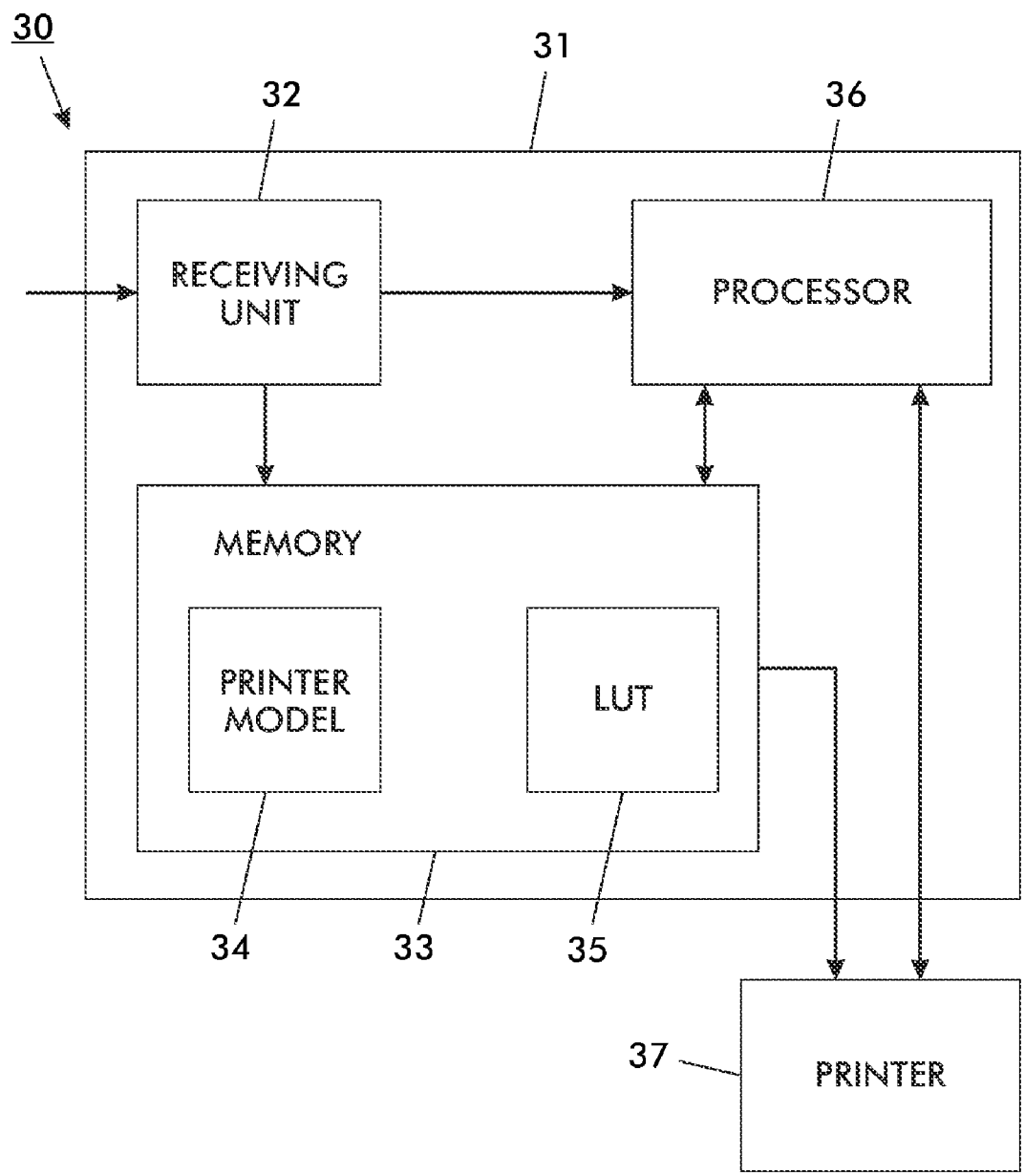
FIG. 3 illustrates an exemplary printing system according to this disclosure.

With reference to FIG. 3, illustrated is an exemplary color printing system 30 according to this disclosure. Images are received in a device independent color representation at a receiving unit 32 and mapped through a multidimensional LUT transformation by processor 36 to produce a device dependent representation that is sent to the printer 37. The processor 36 retrieves the multidimensional LUT 35 from memory 33. Derivation of the LUT node values is carried out according to the techniques described in this disclosure.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of generating device dependent color space representations for an image output device comprising:
    (a) generating a colorimetric multi-dimensional LUT including a plurality of nodes, the nodes associated with a plurality of discrete device independent color space representations of a plurality of respective colors, wherein the LUT includes a plurality of in-gamut nodes associated with colors within a color gamut associated with the image output device and a plurality of out-of-gamut nodes associated with colors outside the color gamut associated with the image output device;
    (b) using an iterative process to determine image output device dependent color space representations associated with the plurality of in-gamut nodes;
    (c) mapping the plurality of out-of-gamut nodes to a first surface characterization of the color gamut associated with the image output device;
    (d) determining image output device dependent color space representations associated with the plurality of out-of-gamut nodes mapped at the first surface characterization of the color gamut associated with the image output device via a non-iterative interpolation among nearby device independent color vertices associated with a second surface characterization of the color gamut associated with the image output device for which device dependent color space representations have been pre-calculated;
    (e) generating a device dependent color space representation for device independent color space representations not associated with a node and inside the color gamut associated with the image output device, by interpolating among a plurality of the nodes nearby the device independent color space representation not associated with a node, wherein the image output device dependent color space representations determined in one or both of step b) and step d) are used to interpolate among the plurality of the nodes nearby the device independent color space representation not associated with a node and inside the color gamut associated with the image output device; and
    (f) generating a device dependent color space representation for a device independent color space representation not associated with a node and outside the color gamut associated with the image output device, by interpolating among a plurality of the nodes nearby the device independent color space representation not associated with a node, wherein the image output device dependent color space representations determined in one or both of step b) and step d) are used to interpolate among the plurality of the nodes nearby the device independent color space representation not associated with a node and outside the color gamut associated with the image output device.

2. The method of generating device dependent color space representations for an image output device according to claim 1, wherein the vertices form a triangular mesh spanning the entire gamut surface.

3. The method of generating device dependent color space representations for an image output device according to claim 1, wherein step (d) comprises performing an extrapolation process to determine image output device dependent color space representations at LUT nodes immediately outside the gamut boundary, and interpolating among nodes of the enclosing subcell to obtain device values for out-of-gamut nodes mapped at the device gamut boundary.

4. The method of generating device dependent color space representations for an image output device according to claim 1, wherein step (d) comprises performing an iterative process to determine image output device dependent color space representations at LUT nodes immediately outside the gamut boundary, and interpolating among nodes of the enclosing subcell to obtain device values for out-of-gamut nodes mapped at the device gamut boundary.

5. The method of generating device dependent color space representations for an image output device according to claim 1, wherein the image output device is a printer.

6. The method of generating device dependent color space representations for an image output device according to claim 1, wherein the device dependent color space representations is one of CMY, CMYK, CMYKOG, CMYKOV, RGB.

7. The method of generating device dependent color space representations for an image output device according to claim 1, wherein the device independent color space representation is one of CIE L*a*b*, CIE XYZ, sRGB, AdobeRGB.

8. The method of generating device dependent color space representations for an image output device according to claim 1, wherein the image output device is a printer, the device dependent color space representation is CMYK, and the device independent color space representation is L*a*b*.

9. An image output system comprising:
    an image output device; and
    a controller, operatively connected to the image output device, the controller configured to execute a method of generating device dependent color space representations for the image output device, the method comprising:
        (a) generating a colorimetric multi-dimensional LUT including a plurality of nodes, the nodes associated with a plurality of discrete device independent color space representations of a plurality of respective colors, wherein the LUT includes a plurality of in-gamut nodes associated with colors within a color gamut associated with the image output device and a plurality of out-of-gamut nodes associated with colors outside the color gamut associated with the image output device;
        (b) using an iterative process to determine image output device dependent color space representations associated with the plurality of in-gamut nodes;
        (c) mapping the plurality of out-of-gamut nodes to a first surface characterization of the color gamut associated with the image output device;
        (d) determining image output device dependent color space representations associated with the plurality of out-of-gamut nodes mapped at the first surface characterization of the color gamut associated with the image output device via a non-iterative interpolation among nearby device independent color vertices associated with a second surface characterization of the color gamut associated with the image output device for which device dependent color space representations have been pre-calculated;

(e) generating a device dependent color space representation for device independent color space representations not associated with a node and inside the color gamut associated with the image output device, by interpolating among a plurality of nodes nearby the device independent color space representation not associated with a node, wherein the image output device dependent color space representations determined in one or both of step b) and step d) are used to interpolate among the plurality of the nodes nearby the device independent color space representation not associated with a node and inside the color gamut associated with the image output device; and (f) generating a device dependent color space representation for a device independent color space representation not associated with a node and outside the color gamut associated with the image output device, by interpolating among a plurality of the nodes nearby the device independent color space representation not associated with a node, wherein the image output device dependent color space representations determined in one or both of step b) and step d) are used to interpolate among the plurality of the nodes nearby the device independent color space representation not associated with a node and outside the color gamut associated with the image output device.

10. The image output system according to claim 9, wherein step (d) comprises performing an iterative process to determine image output device dependent color space representations at LUT nodes immediately outside the gamut boundary, and interpolating among nodes of the enclosing subcell to obtain device values for out-of-gamut nodes mapped at the device gamut boundary.

11. The image output system according to claim 9, wherein the vertices form a triangular mesh spanning the entire gamut surface.

12. The image output system according to claim 9, wherein step (d) comprises performing an extrapolation process to determine image output device dependent color space representations at LUT nodes immediately outside the gamut boundary, and interpolating among nodes of the enclosing subcell to obtain device values for out-of-gamut nodes mapped at the device gamut boundary.

13. The image output system according to claim 9, wherein the image output device is a printer.

14. The image output system according to claim 13, wherein wherein the device dependent color space representations is one of CMY, CMYK, CMYKOG, CMYKOV, RGB.

15. The image output system according to claim 9, wherein the device independent color space representation is one of CIE L*a*b*, CIE XYZ, sRGB, AdobeRGB.

16. The image output system according to claim 9, wherein the image output device is a printer, the device dependent color space representation is CMYK, and the device independent color space representation is L*a*b*.

17. A xerographic imaging system comprising:
one or more image marking engines (IMEs);
a controller operatively connected to the one or more IMEs, the controller configured to execute a method of generating device dependent color space representations of an image to be printed by one or more IMEs, the method comprising:

(a) generating a colorimetric multi-dimensional LUT including a plurality of nodes, the nodes associated with a plurality of discrete device independent color space representations of a plurality of respective colors, wherein the LUT includes a plurality of in-gamut nodes associated with colors within a color gamut associated with the IME and a plurality of out-of-gamut nodes associated with colors outside the color gamut associated with the IME;

(b) performing an iterative process to determine IME dependent color space representations associated with the plurality of in-gamut nodes;

(c) mapping the plurality of out-of-gamut nodes to a first surface characterization of the color gamut associated with the IME;

(d) determining IME dependent color space representations associated with the plurality of out-of-gamut nodes mapped at the first surface characterization of the color gamut associated with the image output device using a non-iterative interpolation among nearby device independent color vertices associated with a second surface characterization of the color gamut associated with the IME for which device dependent color space representations have been pre-calculated;

(e) generating a device dependent color space representation for device independent color space representations not associated with a node and inside the color gamut associated with the IME, by interpolating among a plurality of the nodes nearby the device independent color space representation not associated with a node, wherein the IME dependent color space representations determined in one or both of step b) and step d) are used to interpolate among the plurality of the nodes nearby the device independent color space representation not associated with a node and inside the color gamut associated with the IME; and (f) generating a device dependent color space representation for a device independent color space representation not associated with a node and outside the color gamut associated with the IME, by interpolating among a plurality of the nodes nearby the device independent color space representation not associated with a node, wherein the IME dependent color space representations determined in one or both of step b) and step d) are used to interpolate among the plurality of the nodes nearby the device independent color space representation not associated with a node and outside the color gamut associated with the IME.

* * * * *